United States Patent [19]

Hsu

[11] Patent Number: 5,137,287
[45] Date of Patent: Aug. 11, 1992

[54] PIVOTED CHUCKING JAWS WITH LOW FRICTION ROLLERS

[75] Inventor: Hsiao-Shu Hsu, Cedar Falls, Iowa

[73] Assignee: Deere & Company, Moline, Ill.

[21] Appl. No.: 655,008

[22] Filed: Feb. 13, 1991

[51] Int. Cl.⁵ .................................... B23B 31/16
[52] U.S. Cl. ........................ 279/2.23; 279/2.24; 279/123; 279/132; 279/152
[58] Field of Search ............ 279/2 R, 2 A, 1 DA, 279/123, 106, 110, 1 J, 2.23, 2.24, 132, 152; 269/258, 259, 262, 265, 268

[56] References Cited

U.S. PATENT DOCUMENTS 2,815,959  12/1957  Vandenberg .................. 279/123

Primary Examiner—Steven C. Bishop

[57] ABSTRACT

A chuck jaw is provided having a pivotally mounted gripper mounted to the base jaw. Each end of the gripper serves as a chuck point, so that a three-jaw chuck can be used to provide six chuck points. Preferably, rollers are provided at each chuck point of the gripper to ensure even distribution of forces around the workpiece. In addition, spring plungers preferably are provided to limit the degree of pivoting of the gripper relative to the base jaw when a workpiece is not mounted on the chuck.

10 Claims, 2 Drawing Sheets

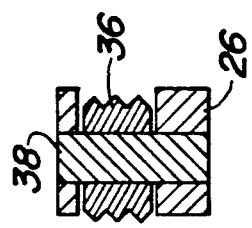
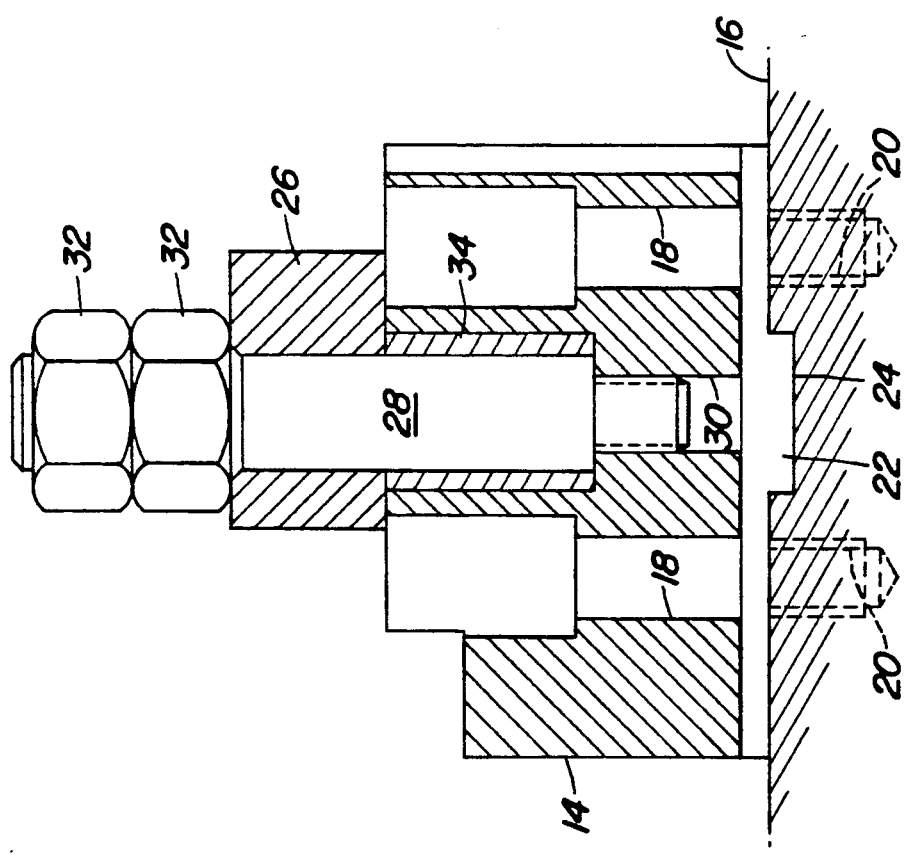

ary3,137,287

PIVOTED CHUCKING JAWS WITH LOW FRICTION ROLLERS

BACKGROUND OF THE INVENTION

1. Field of the Invention

The present invention relates to chucks for lathes and similar machine tools, and in particular, to chucks suitable for handling thin walled workpieces.

2. Description of the Related Art

On lathes and similar machine tools, chucking pressure can cause distortion in the workpiece that may cause the resulting part to be out of specification when removed from the chuck. This is a common manufacturing problem, especially for thin-walled parts. A six-jaw, manually-operated chuck or a three-jaw, hydraulically powered chuck with wider width jaws sometimes is used on pre-machined inside or outside diametrical surfaces of the workpiece to minimize this problem. Other times, the parts are clamped on a side surface and machined as a secondary operation. In either situation, extra machining or an extra operation is required.

SUMMARY OF THE INVENTION

It is the object of the present invention to provide a powered chuck which will properly center a workpiece with unmachined surfaces and minimal workpiece distortion.

This object is achieved according to the present invention using a hydraulically powered three-jaw chuck having six chucking points. To accomplish this, a gripper is pivotally mounted to each jaw of the three-jaw chuck. Each end of each gripper servers as a chuck point, in effect providing six chuck points.

Friction between the gripper ends and the workpiece may prevent the chucking forces from being evenly distributed, and parts therefore might still be distorted. Accordingly, a roller preferably is mounted to each chuck point on each gripper. The six rollers then form the six chuck points. Providing rollers at the end of each gripper support will allow the gripper support to move around the workpiece until the forces are balanced out, minimizing distortion.

A further preferred embodiment of the invention provides a mechanism to limit the degree of pivoting of each gripper when no workpiece is mounted in the clutch. For example, a spring plunger may be mounted on each side of each gripper, with the plunger engaging a corresponding surface on the clutch jaw base. The resiliency of the spring plungers will allow the pivoting flexibility needed to allow force distribution, but limit the total pivot distance.

It has been found that parts manufactured with the new jaws are more consistent in roundness and size than parts manufactured with conventional chucks. A powered chuck can be used instead of a manual chuck, increasing speed. In addition, pre-machining becomes unnecessary, so that manufacturing costs are greatly reduced.

BRIEF DESCRIPTION OF THE DRAWINGS

FIG. 2 is a cross section along line 2—2 of FIG. 1.

FIG. 3 is a cross section along line 3—3 in FIG. 1.

DETAILED DESCRIPTION OF THE PREFERRED EMBODIMENT

Figure 1:
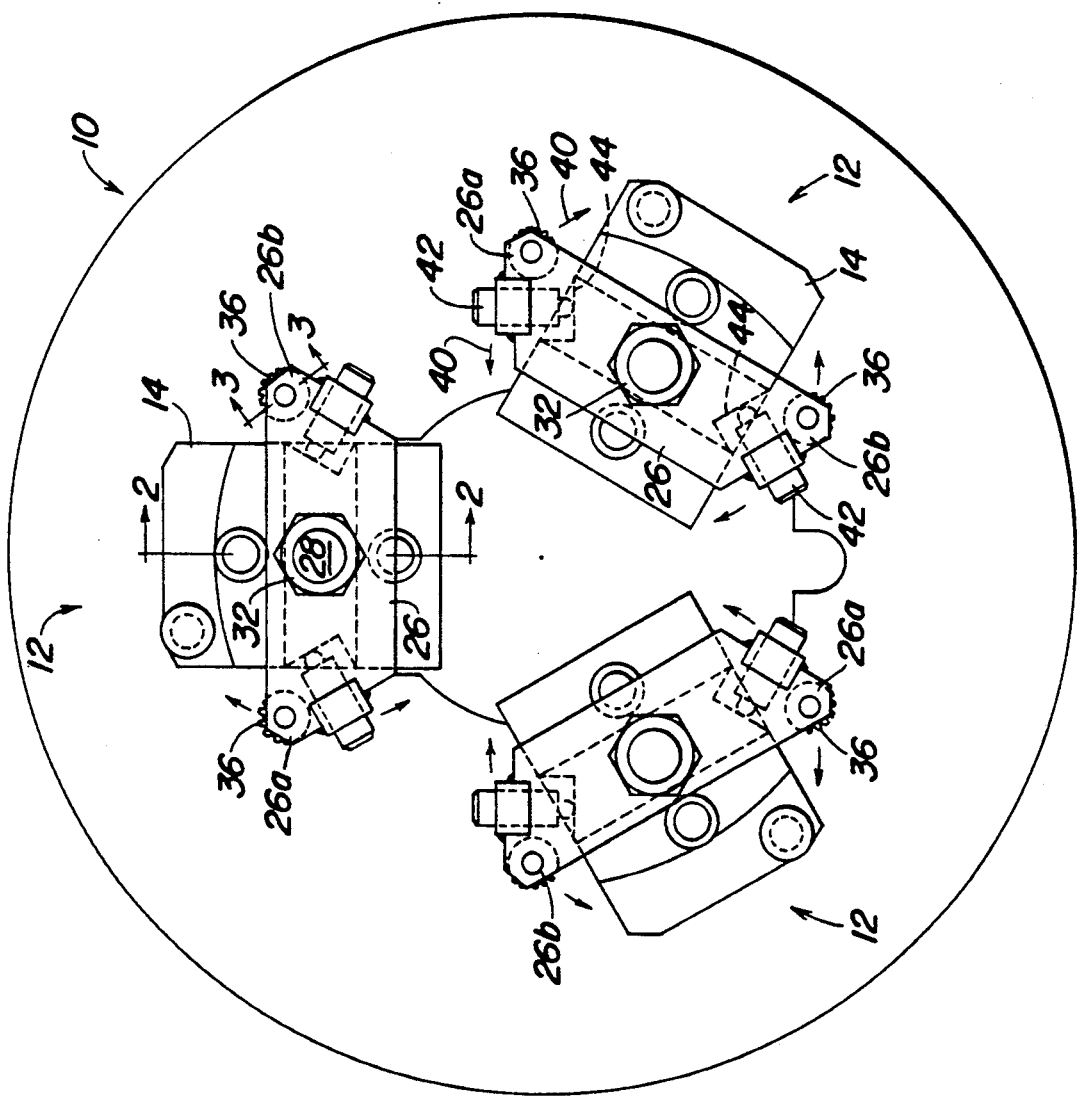
FIG. 1 is a plan view of a lathe chuck according to the present invention.

FIG. 1 generally shows a chuck 10 for a lathe or similar machine tool, of the type normally having three chuck jaws. The usual chuck jaws have been replaced by three chuck elements 12 according to the present invention. Each chuck element 12 provides two chucking points for holding an inside surface of a workpiece, so that the three-jaw chuck 10 in effect provides six chuck points.

Referring to FIG. 2, a jaw blank 14 is mounted to the usual chuck base jaw 16, e.g., by bolts (not shown), in matching bores 18, 20. The jaw blank 14 preferably is provided with a key 22 which engages a corresponding key slot 24 formed in the base jaw 16. Under normal circumstances, the key 22 and key slot 24 will provide most of the force transmission between the base jaw 16 and the jaw blank 14.

A gripper 26 is pivotally mounted to the top of the jaw blank 14, e.g., by a pin 28. The bottom end of the pin 28 preferably is threadedly engaged with a corresponding bore 30 in the jaw blank 14. The top end of the pin likewise is threaded and is provided with two nuts 32 for adjusting the degree to which the gripper 26 is compressed between the nuts 32 and the top surface of the jaw blank 14. If desired, a bushing 34 can be provided around the pin 28 to ensure that the gripper 26 can pivot relative to the jaw blank 14.

As best seen in FIG. 1, as the grippers 26 are moved outward towards a workpiece, each end 26a, 26b of the gripper 26 will would eventually come into contact with the workpiece. For smooth and/or symmetrical workpieces, a blunt piece of metal at the ends of 26a, 26b might be sufficient to provide equal distribution of the forces. However, it has been found that equalization of the forces can be improved significantly by the addition of a roller 36 at each end 26a, 26b of the gripper 26.

As shown in FIG. 3, each roller is mounted in the gripper 26 by a roller pin 38, which allows the roller 36 to rotate freely. Preferably, the surface of each roller is knurled, or otherwise machined, to provide a firm engagement with the workpiece.

Providing the rollers 38 at each end of the grippers 26 allows the grippers 26 to shift their position around the surface of a workpiece to ensure that all forces are distributed as evenly as possible on the workpiece. This also significantly enhances the ability of the present invention to work with workpieces having unmachined, unfinished surfaces.

Referring again to FIG. 1, it will be apparent that each gripper can pivot freely in the direction of the arrows 40. When no workpiece is present on the chuck 10, this means that gravity would cause each of the grippers 26 to fall into a very cock-eyed position. To limit this excessive pivoting, a spring plunger 42 preferably is provided in or at each end of the gripper 26. The plunger of each spring plunger 42 engages a corresponding surface 44 formed in the jaw blank 14. The spring plungers 42 then will allow a degree of pivoting of the gripper 26 necessary to provide appropriate distribution of forces, but will prevent excessive pivoting when no workpiece is present.

It will be readily apparent that numerous modifications could be made to the present invention. The most readily apparent of these is that while the invention has been described with respect to a chuck having six chuck points and three chuck jaws, a different number of chuck jaws and points could be used. Similarly, chuck jaws have been described for use on the inside of a workpiece, but similar chuck jaws can be provided for use on the outside diameter workpiece, possibly with appropriate modifications to the shape of the gripper 26. Likewise, the spring plungers 42 are shown mounted on the grippers 26, with the engagement surfaces on the jaw blanks 14. However, these positions could easily be reversed. Accordingly, this invention is intended to embrace all alternatives, modifications and variations which fall within the spirit and scope of the appended claims.

I claim:

1. A chuck jaw for mounting to a machine tool base jaw, comprising:
    a jaw blank mounted to the base jaw for movement therewith;
    a gripper pivotally mounted to said base jaw; said gripper having chuck points proximate to its ends; and
    a roller rotatably mounted at each chuck point of said gripper.

2. The chuck jaw of claim 1, further comprising means for limiting the degree of pivoting of said gripper relative to said jaw blank.

3. The chuck jaw of claim 2, wherein said pivoting limiting means comprises at least one spring plunger mounted on one of said gripper and said jaw blank, the spring plunger engaging a spring plunger engagement surface formed in the other of said gripper and said jaw blank.

4. The chuck jaw of claim 1, wherein said jaw blank and said base jaw are provided with corresponding bores and said jaw blank is held to said base jaw by bolts in said corresponding bores.

5. The chuck jaw of claim 4, wherein said jaw blank further is provided with a key and said base jaw is provided with a corresponding keyway for engagement with said key to transmit forces between said jaw blank and said base jaw.

6. The chuck jaw of claim 1, wherein said gripper is pivotally mounted to said jaw blank by a pin extending through said gripper and threadedly engaged with a corresponding threaded bore formed in said jaw blank, and further provided with a pair of nuts engaging a threaded portion of said pin above said gripper, said nuts serving to adjust the degree of compression of said gripper between said nuts and said jaw blank.

7. The chuck jaw of claim 6, further comprising a bushing mounted around said pin to aid in pivoting of said gripper.

8. A chuck jaw for mounting to a machine tool base jaw, comprising:
    a gripper pivotally mounted to said base jaw, said gripper having chuck points proximate to its ends; and
    means for limiting the degree of pivoting of said gripper relative to said jaw blank, said pivoting limiting means comprising at least one spring plunger mounted on one of said gripper and said jaw blank, the spring plunger engaging a spring plunger engagement surface formed in the other of said gripper and said jaw blank.

9. A chuck jaw for mounting to a machine tool base jaw, comprising:
    a jaw blank mounted to the base jaw for movement therewith;
    a gripper pivotally mounted to said base jaw, said gripper having chuck points proximate to its ends and being pivotally mounted to said jaw blank by a pin extending through said gripper and threadedly engaged with a corresponding threaded bore formed in said jaw blank, and further provided with a pair of nuts engaging a threaded portion of said pin above said gripper, said nuts serving to adjust the degree of compression of said gripper between said nuts and said jaw blank.

10. The chuck jaw of claim 9, further comprising a bushing mounted around said pin to aid in pivoting of said gripper.

* * * * *